United States Patent
Torkamani et al.

(10) Patent No.: US 12,204,645 B1
(45) Date of Patent: Jan. 21, 2025

(54) MACHINE LEARNING MODEL EVALUATION AND COMPARISON

(71) Applicant: Amazon Technologies, Inc., Seattle, WA (US)

(72) Inventors: MohamadAli Torkamani, Scarsdale, NY (US); Bhavna Soman, Seattle, WA (US); Jeffrey Earl Bickford, Thornton, CO (US); Baris Coskun, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 17/528,019

(22) Filed: Nov. 16, 2021

(51) Int. Cl.
*G06F 21/56* (2013.01)
*G06F 21/57* (2013.01)
*G06N 20/20* (2019.01)

(52) U.S. Cl.
CPC ............ *G06F 21/57* (2013.01); *G06F 21/566* (2013.01); *G06N 20/20* (2019.01)

(58) Field of Classification Search
CPC ........ G06F 21/57; G06F 21/566; G06N 20/20
See application file for complete search history.

(56) References Cited

U.S. PATENT DOCUMENTS

| | | | |
|---|---|---|---|
| 2021/0073377 A1* | 3/2021 | Coull | G06N 20/00 |
| 2021/0314333 A1* | 10/2021 | Krisiloff | H04L 63/1416 |
| 2021/0319099 A1* | 10/2021 | Gaddam | G06F 21/554 |

OTHER PUBLICATIONS

Fedorchuk, Maksym and Bart Lamiroy, "Binary Classifier Evaluation Without Ground Truth," Ninth International Conference on Advances in Pattern Recognition (ICAPR-2017), Dec. 2017, Bangalore, India, HAL Id: hal-01680358, URL: https://hal.archives-ouvertes.fr/hal-01680358/file/icapr2017.pdf, 7 pages.

Pennsylvania State University, "1.9—Hypothesis Test for the Population Correlation Coefficient," Pennsylvania State University, Eberly College of Science, Department of Statistics, STAT 501, Regression Methods, URL: https://online.stat.psu.edu/stat501/lesson/1/1.9, 4 pages.

(Continued)

*Primary Examiner* — Joseph P Hirl
*Assistant Examiner* — Aayush Aryal
(74) *Attorney, Agent, or Firm* — Athorus, PLLC

(57) ABSTRACT

Disclosed are systems and methods to compare two or more machine learning models to determine the comparative performance of those models. Markers may be assigned to data items and data item marker scores generated for those data items, independent of the machine learning models. Each of the machine learning models to be compared may then process the data items and generate respective model scores for those data items. A sub-set of the data items may then be generated for each machine learning model based on the model scores assigned to the data items by the respective model. A model marker score may then be computed for each machine learning model based on the marker scores assigned to each of the data items of the sub-set of data items determined for each model. Finally, the model marker scores may be compared to determine which machine learning model has the highest performance.

20 Claims, 10 Drawing Sheets

(56) References Cited

OTHER PUBLICATIONS

Raj, B., et al., "A Paired Test for Recognizer Selection With Untranscribed Data," 2011 IEEE International Conference on Acoustics, Speech and Signal Processing (ICASSP), Machine Learning for Signal Processing Group, Prague, Czech Republic, URL: http://mlsp.cs.cmu.edu/people/rsingh/docs/pairedtest.pdf, 4 pages.

Ratner, A., et al., "Snorkel: Rapid Training Data Creation with Weak Supervision," In the 44th International Conference on Very Large Data Bases, Aug. 2018, Rio De Janeiro, Brazil, Proceedings of the VLDB Endowment, vol. 11, No. 3, URL: https://arxiv.org/pdf/1711.10160.pdf, 17 pages.

Sommer, Robin and Vern Paxson, "Outside the Closed World: On Using Machine Learning for Network Intrusion Detection," 2010 IEEE Symposium on Security and Privacy, May 16-19, 2010, Oakland, CA, USA, URL: https://www.icir.org/robin/papers/oakland10-ml.pdf, 12 pages.

* cited by examiner

MACHINE LEARNING MODEL EVALUATION AND COMPARISON

BACKGROUND

In many machine learning applications, reliable ground truth data, also known as labels, is not available. In many instances, such as the security domain, labels are noisy, sparse or absent. As a result, performance metrics of two different machine learning models might be the same, or at least very similar, on a limited set of labeled data items. However, those two models may perform very differently on a larger set of unseen data items. As a result, commonly used metrics such as accuracy, precision and recall, or performance curves, do not provide sufficient confidence in the real-world performance of different machine learning models. To resolve this problem, current solutions utilize lengthy manual evaluation of a trained machine learning model to gain confidence in the model's performance before it is deployed, for example to replace an existing model.

DETAILED DESCRIPTION

Figure 1:
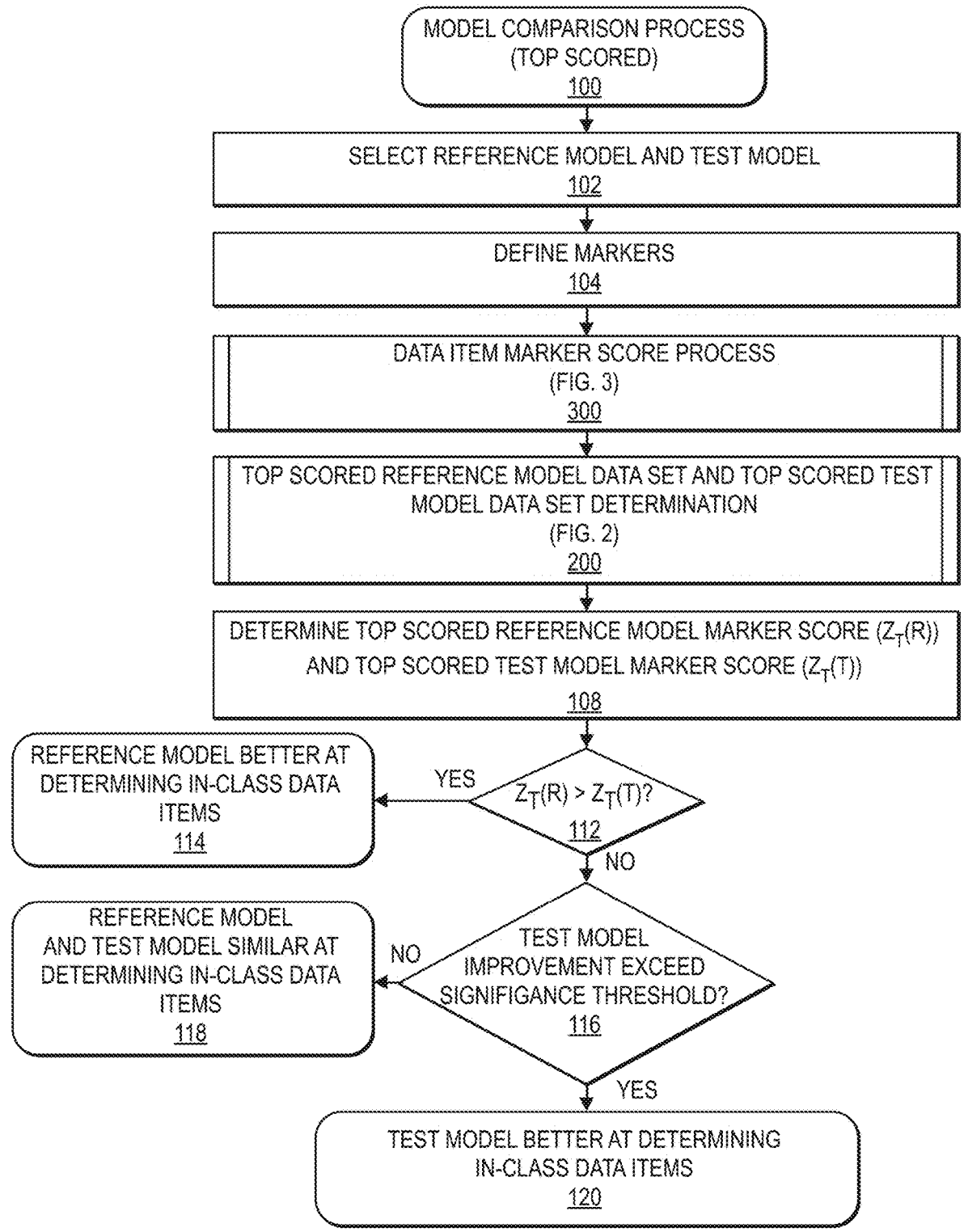
FIG. 1 is an example machine learning model comparison process utilizing top scored data items, in accordance with disclosed implementations.

Disclosed are systems and methods to compare two or more machine learning models to determine the comparative performance of those models. For ease of explanation of the disclosed implementations, the discussion will focus primarily on machine learning models trained to detect potentially malicious data items, such as domains, and comparing the performance of two different machine learning models trained to detect malicious data items. However, the disclosed implementations are equally applicable to any type and/or number of trained machine learning models for which performance comparisons are desired. For example, the disclosed implementations may be used to compare the performance of two or more machine learning models trained for malware detection, malicious file detection, anomalous behavior detection, event sequence detection, natural language processing ("NLP") translation detection, malicious email detection, phishing detection, etc. Likewise, it will be appreciated that the disclosed implementations are applicable to both supervised learning models and unsupervised machine learning models.

To compare machine learning models, one or more markers are defined for a data set that includes a plurality of data items (e.g., domains) for which the models are trained. As discussed further below, a marker relates to an aspect of a data item and may be used as a predictor as to the likelihood that the data item is of a class (e.g., malicious domains) for which the machine learning model has been trained to detect. Markers may be defined based on expertise of the data item classes for which the machine learning models are trained and may be common for all data items that may be processed by a trained machine learning model for that data item class. Accordingly, markers may be generally defined for all data items that may be processed by a machine learning model and applied to a data set of those data items to determine the likelihood that each data item of the data set is in-class for a class or out-of-class for that class. In some examples, multiple classes may be processed and determinations made for a data item for each of the multiple classes as to whether the marker is in-class or out-of-class for each class processed by the disclosed implementations.

As discussed further below, with the disclosed implementations, the markers need not be definitive—i.e., markers may provide weak signals and/or be imperfect in accuracy. However, the combination of markers defined for a data item type, in accordance with the disclosed implementations, provide high confidence as to the comparative performance of two or more trained machine learning models. In addition, a data item marker score ($Z_i$) for a data item may be determined independent of the machine learning models being compared. For example, a plurality of markers may be defined for a data set and each data item of the data set may be processed to compute a respective data item marker score based on the presence or absence of the defined plurality of markers in the data item.

To compare two (or more) trained machine learning models, data items from a set of data items for which data item markers scores have been generated are processed by the first machine learning model to generate, for each processed data item, a first probability score, also referred to herein as a first model score or a reference model score, indicative of the probability that the data item is of a class for which the first machine learning model is trained to detect. For example, if the first machine learning model is trained to detect malicious domains (a class), each domain (data item) is processed by the first machine learning model, without considering the marker score, and a first model score is assigned to each data item that is indicative of a probability that the data item is a malicious domain, as determined by the first machine learning model.

In addition, the data items of that data set are also processed by the second machine learning model to generate, for each processed data item, a second probability score, also referred to herein as a second model score or a test model score, indicative of the probability that the data item is of a data item type for which the second machine learning model is trained to detect. For example, if the second machine learning model is trained to detect malicious domains (a class), each domain (data item) is processed by the second machine learning model, without considering the marker score, and a second model score is assigned to each data item that is indicative of a probability that the data item is a malicious domain, as determined by the second machine learning model.

A first sub-set of the plurality of data items may then be selected for the first machine learning model and a second sub-set of the plurality of data items may be selected for the second machine learning model. For example, the first sub-set of data items from the plurality of data items may include a defined number (k) of data items having highest first model scores, as determined by the first machine learning model. Likewise, the second sub-set of data items from the plurality of data items may include the defined number (k) of data items having highest second model scores, as determined by the second machine learning model.

As discussed further below, even though the data items of the first sub-set of data items and the second sub-set of data items all come from the same data set, some or all of the data items of the first sub-set of data items may be different than the data items of the second sub-set of data items because the first machine learning model and the second machine learning model may assign different probability scores to those same data items. This difference is due to the fact that the two machine learning models may have been trained differently, trained using different training data, may be based on different algorithms, etc. However, the probability score differences between the two models are insufficient to determine which model performs better than the other. This is because the scores may be based on different factors, have different weightings, may be inherently biased based on the training of the models, etc. To resolve this problem, the markers and the sub-sets of data items may be utilized to determine the performance of the models.

For example, a first model marker score may be computed from the first sub-set of data items and a second model marker score may be computed from the second sub-set of data items. For example, the first model marker score may be the sum of each data item marker score determined for the data items included in the first sub-set of data items. Likewise, the second model marker score may be the sum of each data item marker score determined for the data items included in the second sub-set of data items. In other examples, the model marker scores may each be an average of each data item marker score determined for the data items of the respective sub-set of data item.

The machine learning model with the higher model marker score may then be identified as the model that comparatively performs better. Based on the determined comparative performance of the machine learning models, it may be decided which model should be used to process data items for which the models are trained. For example, if both models are trained at the same/similar time, using for example different algorithms, data, etc., and one is to be deployed, the one that is determined to have the higher model marker score may be selected as the better performing model and deployed into production.

In some implementations, the model marker scores may be further processed to determine if the difference is statistically significant. For example, if the first machine learning model is a reference model that is already in production and the second machine learning model is a test model that has been newly trained, it may be determined whether a difference between the test model marker score and the reference model marker score is statistically significant. In such an example, if it is determined that the test model marker score is higher than the reference model marker score and that the difference is statistically significant, the test machine learning model may be determined to be a better performing model and deployed into production to replace the reference machine learning model.

FIG. 1 is an example machine learning model comparison process 100 utilizing top scored data items, in accordance with disclosed implementations.

The example process 100 begins by selecting a reference machine learning model, also referred to herein as a first model or a reference model, and a test machine learning model, also referred to herein as a test model or a second model, as in 102. As discussed above, the reference model and the test model may be any two machine learning models that have been trained to process the same types of data items for the same type(s) of purpose(s), such as detection of malicious domains. Likewise, while the discussed examples describe comparison of the performance of two machine learning models, the disclosed implementations may be used with any number of machine learning models (two or more) and the discussion of two models is provided only for ease of explanation.

In addition, one or more markers are defined for a data set that includes a plurality of data items that may be processed by the first model and the second model, as in 104. A marker, as used herein, is a weak predictor derived using expertise that is relevant to a type of data item for which the machine learning models have been trained. In some implementations a marker may be an in-class marker that, if detected in a data item, is indicative of the data item being of a type/class for which the machine learning models have been trained to detect. For example, in detecting potentially malicious (class) domains (a data item), an in-class marker may be defined based on the domain age ("domainAge") of the domain. For example, an in-class marker may be defined as domainAge<1. In such an example, if a data item has a domainAge of less than one, an in-class marker score, such as a positive number, is assigned to that data item. Other examples of in-class markers for data items of domains may be defined based on, for example, the Average Time to Live ("TTL") of the data item, Number of TTLs of the data item, Number of IP addresses to which the data item resolves, etc. If the in-class marker is not detected, a null score (e.g., 0) or a score indicative of the data item being out-of-class, such as a negative score, may be assigned to the data item for the marker.

In addition to or as an alternative of in-class markers, in some implementations, one or more out-of-class markers may be defined such that, if a data item includes an out-of-class marker, the data item may be assigned an out-of-class marker score, such as a negative number or null number. Out-of-class markers may be indicative of a data item not being of a type/class for which the machine learning model was trained. For example, and continuing with the example of data items being domains and the machine learning models being trained to detect potentially malicious domains, an out-of-class marker may be based on the popularity of the domain or the registrar that maintains the domain. For example, an out-of-class marker may be defined as a domain having a popularity in the top 10,000 domains. In such an example, if the domain (a data item) is in the top 10,000 domains, for example as determined by ALEXA domain ranking, an out-of-class marker score, such as a negative number, may be assigned to that data item.

In some implementations, a plurality of markers and/or markers for different classes may be defined. In such examples, each data item of a data set may be processed to determine if one or more of the plurality of markers are present in the data item. In such an example, a marker score, such as an in-class marker score (e.g., +1), an out-of-class marker score (e.g., −1), or a null score (e.g., 0) may be assigned to a data item for each marker and a data item marker score ($Z_i$) determined based on each of those individual marker scores assigned to the data item. For example, as illustrated in the following equation (1) and table 1, each marker score assigned to a data item may be summed to determine a data item marker score ($Z_i$) for the data item.

$$Z_i = \sum_{j=1}^{M} m_j(s_i) \quad (1)$$

TABLE 1

| DATA ITEM | MARKER 1 | MARKER 2 | MARKER 3 | MARKER 4 | MARKER SCORE ($Z_i$) |
|---|---|---|---|---|---|
| www.aaa.com | 0 | 0 | −1 | −1 | −2 |
| www.bbb.com | 1 | 1 | 0 | 0 | 2 |

In another example, one or more of the marker scores may be weighted to either increase or decrease the value of the score based on any of a variety of factors. A weighting may be applied to an in-class marker score and/or an out-of-class marker score based on, for example, a confidence in the score, a frequency in which the marker is detected in the data set, an importance of the marker in determining whether the data item is indicative of a type to be detected by the machine learning model (in-class marker) or indicative of a type of item that should not be detected by the machine learning model (out-of-class marker), etc. In still other examples, the marker scores may be determined for different classes, with each class having corresponding markers.

Returning to FIG. 1, a data item marker score is determined for each data item of the data set to be utilized by the example process 100, as in 300. Determination of the data item marker scores is discussed further below with respect to FIG. 3.

In addition to determining data item marker scores for data items of the data set, a top scored reference data set and a top scored test model data set are determined, as in 200. Determination of the top scored reference model data set and the top scored test model data set is discussed further below with respect to FIG. 2. As discussed further below, the top scored reference model data set and the top scored test model data set each include a sub-set of the data set of data items and are determined based on how the respective models (reference model and test model) processed the data items and the corresponding model scores assigned to those data items by the respective model.

Based on the data item marker scores assigned to each data item included in the top scored reference model data set, a top scored reference model marker score ($Z_T(R)$) for the reference model is determined, as in 108. For example, the marker scores assigned to each of the data items included in the top scored reference model data set may be combined, for example in accordance with equation (2), below, to produce a top scored reference model marker score ($Z_T(R)$) for the reference model. Likewise, based on the test model scores assigned to each data item included in the top scored test model data set, a top scored test model marker score ($Z_T(T)$) for the test model is determined, as in 108. For example, the marker scores assigned to each of the data items included in the top scored test model data set may be combined, for example in accordance with equation (2), to produce a top scored test model marker score ($Z_T(T)$) for the reference model.

$$Z(S) = \frac{1}{N} \sum_{i=1}^{N} z_i$$

Even though the data item marker scores are determined independent of the reference model and the test model, because the top scored reference model data set and the top scored test model data set include different data items from the data set, which are selected based on the model scores assigned to those data items by the respective machine learning models, the top scored reference model marker score and the top scored test model marker score may differ.

A determination may then be made as to whether the top scored reference model marker score ($Z_T(R)$) is greater than the top scored test model marker score ($Z_T(T)$), as in 112. If it is determined that the top scored reference model marker score is greater than the top scored test model marker score, the example process determines that the reference model is better than the test model at processing data items to determine in-class data items, as in 114. Again, continuing with the malicious domain example, if the example process 100 determines that the top scored reference model marker score is greater than the top scored test model marker score, it is determined that the reference model is better than the test model at detecting malicious domains (in-class). In comparison, if it is determined that the top scored reference model marker score is not greater than the top scored test model marker score, it may be determined that the test model is better at detecting data items (domains) of the class (malicious) than the reference model.

In some implementations, in response to determining that the top scored reference model marker score is not greater than the top scored test model marker score, a determination may be made as to whether the improvement of the test model over the reference model exceeds a significance threshold, as in 116. The significance threshold may be any value and, in some implementations, may be zero. In other examples, the significance threshold may be a determination as to whether the difference is statistically significant. Any of a variety of techniques may be utilized to determine whether the difference between the top scored reference model marker score and the top scored test model marker score is statistically significant. For example, a Welch's t-test, which is known in the art, may be utilized to determine a p-value between the top scored reference model marker score and the top scored test model marker score. For example, a p-value may be determined as a difference between an average and/or standard deviation between each of the marker scores determined for each data item included in the top scored reference model and an average and/or standard deviation between each of the marker scores determined for each data item included in the top scored test model. If the p-value is less than a defined number, it may be determined that the difference is statistically significant. For example, the defined number may be 0.05. In other implementations, the defined number may be lower (e.g., 0.02), resulting in a more conservative approach (i.e., larger required difference) in determining if the test model is performing significantly better than the reference model. In comparison, if the defined number is higher (e.g., 0.07), a more aggressive approach is applied and a smaller difference between the top scored test model marker score and the top scored reference model marker score is needed to determine that the difference is statistically significant.

If it is determined that the test model improvement over the reference model does not exceed the significance threshold, a determination is made that the reference model and the test model are similar at determining in-class data items (e.g., malicious domains), as in 118. In an example where the reference model has been deployed, such a determination may result in a decision to not replace the reference model with the test model.

In comparison, if it is determined that the difference between the reference model and the test model does exceed the significance threshold, it may be determined that the test model performs better at determining in-class data items (e.g., malicious data), as in 120.

Figure 2:
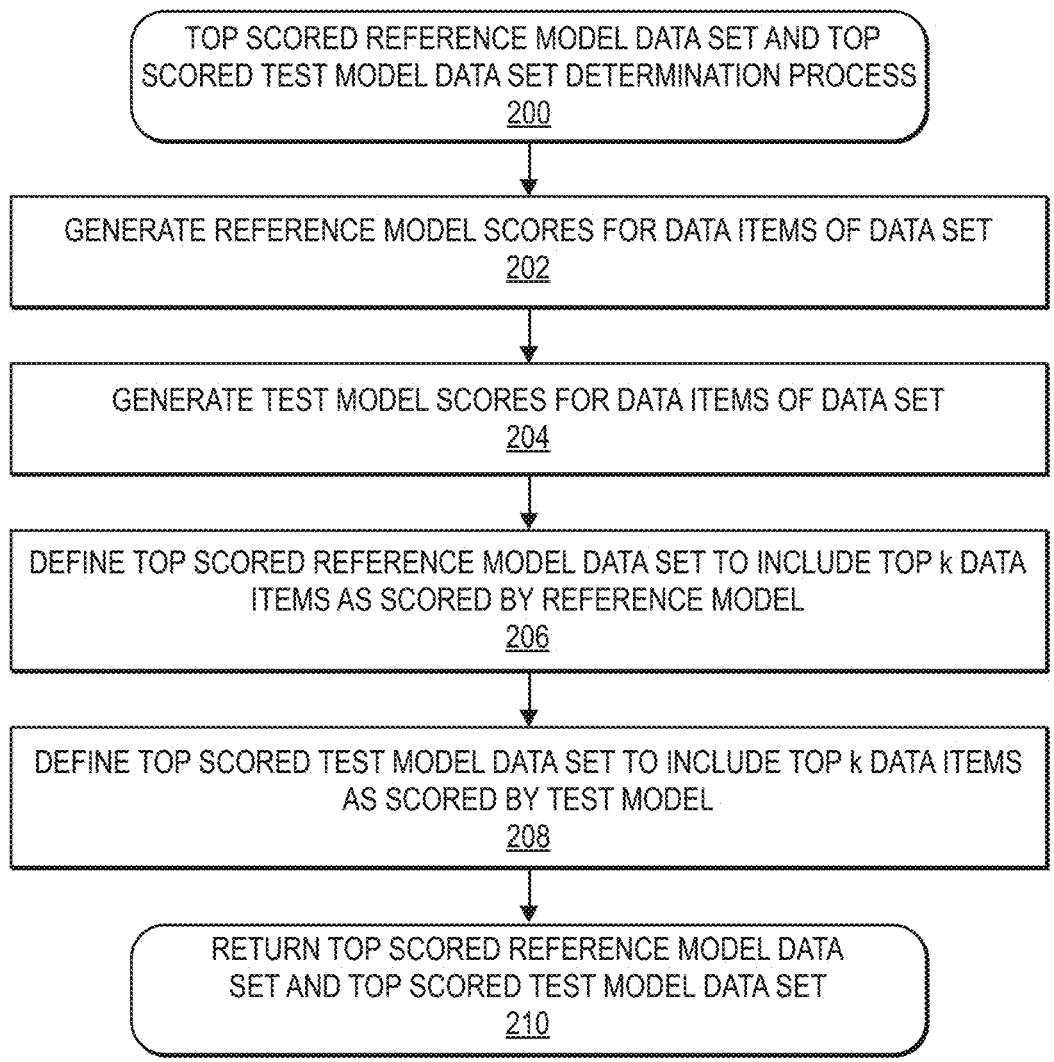
FIG. 2 is an example top scored reference model data set and top scored test model data set determination process, in accordance with disclosed implementations.

FIG. 2 is an example top scored reference model data set and top scored test model data set determination process 200, in accordance with disclosed implementations.

The example process 200 begins by generating reference model scores for data items of the data set, as in 202. As discussed above, a data set that includes a plurality of data items of a type that may be processed by the reference model and the test model may be established. Each of those data items may be processed by the reference model to compute reference model scores indicative of a likelihood that the data item is of a type/class for which the reference model is trained to detect. For example, if the reference model is trained to detect malicious domains, each domain (a data item) of the data set may be processed by the reference model and a corresponding reference model score output by the reference model indicating a likelihood, as determined by the reference model, that the domain is a malicious domain.

Likewise, each data item of the data set may be processed by the test model to compute test model scores indicative of a likelihood that the data item is of a type/class for which the test model is trained to detect, as in 204. For example, if the test model is trained to detect malicious domains, each domain (a data item) of the data set may be processed by the test model and a corresponding test model score output by the test model indicating a likelihood, as determined by the test model, that the domain is a malicious domain.

In this example, a top scored reference model data set may be defined to include a defined number (k) of data items from the data set having the highest reference model scores as computed by the reference model, as in 206. The defined number of data items (k) may be any number of data items that is less than all of the data items of the data set. Accordingly, the number of data items included in the top scored reference model data set is a sub-set of the data items included in the data set.

Similarly, a top scored test model data set may be defined to include the defined number (k) of data items from the data set having the highest test model scores as computed by the test model, as in 208. Like the top scored reference model data set, the number of data items included in the top scored test model data set is a sub-set of the data items included in the data set. However, because the model scores assigned by each of the reference model and the test model for the data items of the data set may be different for the same data item, the data items included in each of the top scored reference model data set and the top scored test model data set may be different.

Finally, the example process 200 returns each of the top scored reference model data set and the top scored test model data set, as in 210.

Figure 3:
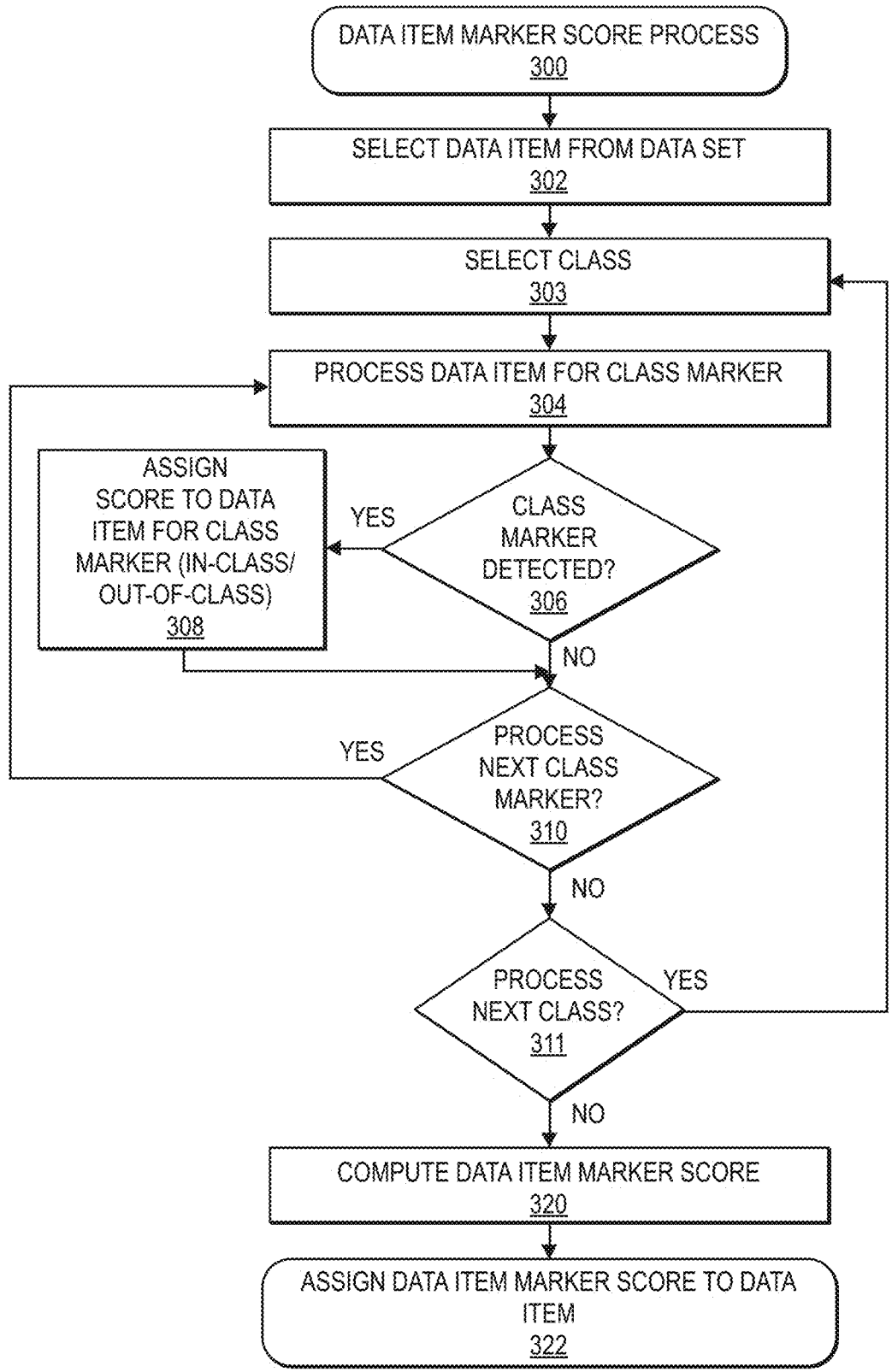
FIG. 3 is an example data item marker score process, in accordance with disclosed implementations.

FIG. 3 is an example data item marker score process 300, in accordance with disclosed implementations. The data item marker score process may be performed independent of the reference model, the test model, or any other machine learning model and is used to assign a data item marker score to data items of the data set based on the markers defined for data items of those data item types.

The example process 300 begins by selecting a data item from the data set that is being used to compare the reference model and the test model, as in 302. Likewise, a class for which the data item and/or data set is to be processed may be determined, as in 303. For example, a plurality of classes may exist for a data set and the machine learning models may be trained to test for one or more of those classes (e.g., malicious data). A plurality of markers, which may include a first plurality of in-class markers and/or a second plurality of out-of-class markers may be defined for each class.

The selected data item may then be processed for a class marker of the one or more markers of the determined class, as in 304, and a determination may then be made as to whether the class marker was detected in the data item, as in 306. If it is determined that the class marker is detected, a marker score is assigned to the data item for that class marker, for example to indicate that the marker is in-class (such as a positive score) or out-of-class (such as a negative score), as in 308. An in-class marker score may be any value that may be used to indicate that the class marker was detected in the data item. For example, the in-class marker score may be positive one. In other examples, the in-class marker score may be higher or lower. Likewise, the in-class marker score may be the same for all in-class markers. In other examples, the in-class marker score may be different for different markers and/or may be weighted based on the confidence in the marker detection. For example, some markers may be determined to be more indicative of the item type being detected and may accordingly be afforded a higher in-class marker score when detected. Likewise, if the class marker is an out-of-class marker and was detected, an out-of-class marker score, such as a negative number may be assigned to the data item for the marker.

If it is determined that the class marker was not detected in the data item or after assigning a class marker score to the data item, a determination is made as to whether a next class marker is to be processed, as in 310. As discussed above, one or more makers may be defined for a class and/or data set. If a next class marker is to be processed, the example process 300 returns to block 304 and processes the next class marker for the selected class.

If it is determined that no additional class markers are to be processed for the class, a determination may be made as to whether a next class is to be selected and processed for the data set, as in 311. If another class is to be processed, the example process 300 returns to block 303, selects the next class, and continues.

If it is determined that no additional classes are to be processed, a data item marker score for the data item may be computed, as in 320. In some examples, the data item marker score may be a combination, such as a summation (see equation (2), above), of each of the marker scores assigned to the data item. In other implementations, the data item marker score may be a different combination of the marker scores assigned to the data item. For example, the data item marker score may be an average of the marker scores assigned to the data item, a weighted average of the marker scores assigned to the data item, a sum of the marker scores assigned to the data item, etc.

Finally, the data item marker score is assigned to the data item, as in 322.

Figure 4:
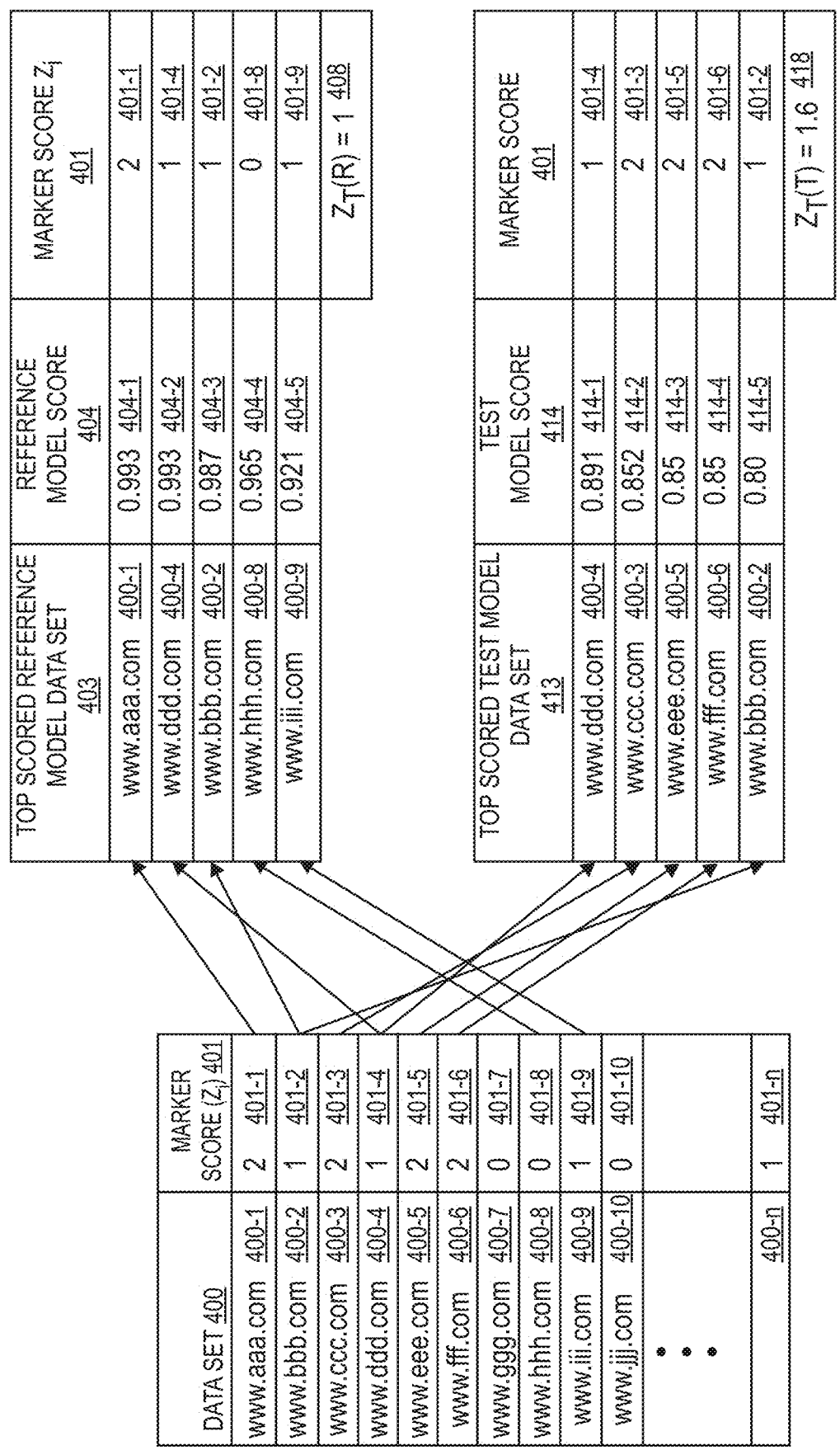
FIG. 4 is a block diagram illustrating an example top scored reference model data set determined from the example data set, and a top scored test model data set determined from the example data set, in accordance with disclosed implementations.

FIG. 4 is a block diagram illustrating an example data set 400, top scored reference model data set 403 determined from the example data set, and a top scored test model data set 413 determined from the example data set 400, in accordance with disclosed implementations.

In the illustrated example, there are N number of data items 400-1, 400-2, 400-3, 400-4, 400-5, 400-6, 400-7, 400-8, 400-9, 400-10, through 400-N in the data set 400. Through use of the example process 300 (FIG. 3), a marker score (Zi) 401-1, 401-2, 401-3, 401-4, 401-5, 401-6, 401-7, 401-8, 401-9, 401-10, through 401-N has been determined for each of the data items 400-1 through 400-N. As discussed above, the marker scores 401 are determined independent of the reference model, the test model, or any other model that may be used to process the data set 400 and are based on markers defined for the data set.

In this example, through the example process 200 (FIG. 2), a top scored reference model data set 403 is determined that includes data items 400-1, 400-4, 400-2, 400-8, and 400-9, which is a first sub-set of the data set 400. As discussed above, the data items 400-1, 400-4, 400-2, 400-8, and 400-9 of the top scored reference model data set 403 are selected as those having the highest reference model scores 404, as determined by the reference model. In this example, data item 400-1 is determined by the reference model to have a reference model score of 0.993 404-1, data item 400-4 is determined by the reference model to have a reference model score of 0.993 404-2, data item 400-2 is determined by the reference model to have a reference model score of 0.987 404-3, data item 400-8 is determined by the reference model to have a reference model score of 0.965 404-4, and data item 400-9 is determined by the reference model to have a reference model score of 0.921 404-5. In this example, these reference model scores 404-1, 404-2, 404-3, 404-4, and 404-5 are the highest reference model scores determined by the reference model for the data items 400-1 through 400-N of the data set 400.

Likewise, and again through the example process 200 (FIG. 2), a top scored test model data set 413 is determined that includes data items 400-4, 400-3, 400-5, 400-6, and 400-2, which is a second sub-set of the data set 400. As discussed above the data items 400-4, 400-3, 400-5, 400-6, and 400-2 of the top scored test model data set 413 are selected as those having the highest test model scores 414, as determined by the test model. In this example, data item 400-4 is determined by the test model to have a test model score of 0.891 414-1, data item 400-3 is determined by the test model to have a test model score of 0.852 414-2, data item 400-5 is determined by the test model to have a test model score of 0.85 414-3, data item 400-6 is determined by the test model to have a test model score of 0.85 414-4, and data item 400-2 is determined by the test model to have a test model score of 0.80 414-5. In this example, these test model scores 414-1, 414-2, 414-3, 414-4, and 414-5 are the highest test model scores determined by the test model for the data items 400-1 through 400-N of the data set 400.

Finally, a top scored reference model marker score $Z_T(R)$ 408 may be computed as a combination of each of the data item marker scores 401 for the data items included in the top scored reference model data set 403. In this example, the top scored reference model marker score $Z_T(R)$ 408 is the average (see equation (2), above) of each of the data item marker scores for the data items included in the top scored reference model data set. Specifically, in this example, the top scored reference model marker score $Z_T(R)$ is 1 408.

Likewise, a top scored test model marker score $Z_T(T)$ 418 may be computed as a combination of each of the data item marker scores 401 for the data items included in the top scored test model data set 413. In this example, the top scored test model marker score $Z_T(T)$ 418 is the average (see equation (2), above) of each of the data item marker scores for the data items included in the top scored test model data set. Specifically, in this example, the top scored test model marker score $Z_T(T)$ is 1.6 418.

Accordingly, as illustrated in this example, even though the reference model scores and test model scores computed for the same data items are very different, the reference model marker score for the top scored reference model data set and the top scored test model marker score for the test model data set illustrate that the test model performs better than the reference model at detecting in-class data items (e.g., malicious domains).

Figure 5:
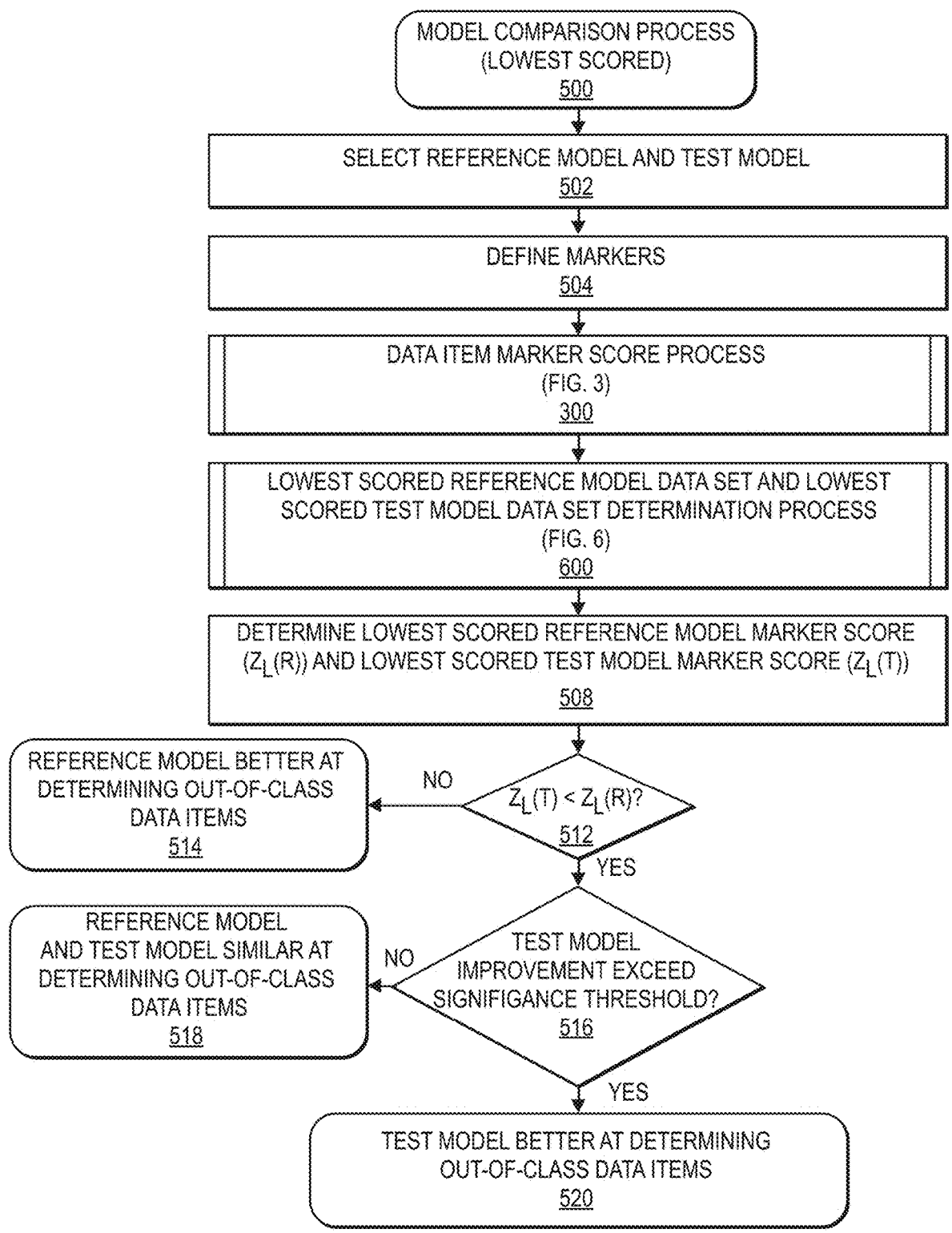
FIG. 5 is an example model comparison process utilizing lowest scored data items, in accordance with disclosed implementations.

FIG. 5 is an example model comparison process 500 utilizing lowest scored data items, in accordance with disclosed implementations.

The example process 500 begins by selecting a reference model and a test model, as in 502. As discussed above, the reference model and the test model may be any two machine learning models that have been trained to process the same types of data items for the same type(s) of purpose(s), such as detection of malicious domains. Likewise, while the discussed examples describe comparison of the performance of two machine learning models, the disclosed implementations may be used with any number of machine learning models (two or more) and the discussion of two models is provided only for ease of explanation.

In addition, one or more markers are defined for a data set that includes a plurality of data items that may be processed by the first model and the second model, as in 504, and the data item marker score process 300 performed to generate data item marker scores for each data item of the data set. In some implementations, if markers have already been defined for the data set, for example as defined at block 104 in FIG. 1, and marker scores generated for the data set, as discussed with respect to FIG. 3, blocks 502 and 300 may be omitted from the example process 500 and the existing marker scores utilized for the data items of the data set.

In addition to determining data item marker scores for data items of the data set or utilizing existing data item marker scores for data items of the data set, a lowest scored reference model data set and a lowest scored test model data set are determined, as in 600. Determination of the lowest scored reference model data set and the lowest scored test model data set is discussed further below with respect to FIG. 6. As discussed further below, the lowest scored reference model data set and the lowest scored test model data set each include a sub-set of the data items of the data set and are determined based on how the respective models (reference model and test model) processed the data items and the corresponding model scores assigned to those data items by the respective model.

Based on the data item marker scores assigned to each data item included in the lowest scored reference model data set, a lowest scored reference model marker score ($Z_L(R)$) for the reference model is determined, as in 508. For example, the marker scores assigned to each of the data items included in the lowest scored reference model data set may be combined, for example in accordance with equation (2) above, to produce a lowest scored reference model marker score ($Z_L(R)$) for the reference model. Likewise, based on the test model scores assigned to each data item included in the lowest scored test model data set, a lowest scored test model marker score ($Z_L(T)$) for the test model is determined, as in 508. For example, the marker scores assigned to each of the data items included in the lowest scored test model data set may be combined, for example as in equation (2) above, to produce a lowest scored test model marker score ($Z_L(T)$) for the reference model.

Even though the data item marker scores are determined independent of the reference model and the test model, because the lowest scored reference model data set and the lowest scored test model data set include different data items from the data set, selected based on the model scores assigned to those data items by the respective machine learning models, the lowest scored reference model marker score and the lowest scored test model marker score may differ.

A determination may then be made as to whether the lowest scored test model marker score ($Z_L(T)$) is less than the lowest scored reference model marker score ($Z_L(R)$), as in 512. If it is determined that the lowest scored reference model marker score is less than the lowest scored test model marker score, the example process determines that the reference model is better than the test model at processing data items and determining out-of-class data items, as in 514. Again, continuing with the malicious domain example, if the example process 500 determines that the lowest scored reference model marker score is less than the test model marker score, it may be determined that the reference model is better than the test model at detecting out-of-class domains (i.e., non-malicious domains). In comparison, if it is determined that the lowest scored reference model marker score is greater than the lowest scored test model marker score, it may be determined that the test model is better at detecting out-of-class data items than the reference model.

In some implementations, in response to determining that the lowest scored reference model marker score is greater than the lowest scored test model marker score, a determination may be made as to whether the improvement of the test model over the reference model at detecting out-of-class data items exceeds a significance threshold, as in 516. The significance threshold may be any value and, in some implementations, may be zero. In other examples, the significance threshold may be a determination as to whether the difference is statistically significant. Any of a variety of techniques may be utilized to determine whether the difference between the lowest scored reference model marker score and the lowest scored test model marker score is statistically significant. For example, a Welch's t-test, which is known in the art, may be utilized to determine a p-value between the lowest scored reference model marker score and the lowest scored test model marker score. For example, a p-value may be determined as a difference between an average and/or standard deviation between each of the marker scores determined for each data item included in the top scored reference model and an average and/or standard deviation between each of the marker scores determined for each data item included in the top scored test model. If the p-value is less than a defined number, it may be determined that the difference is statistically significant. For example, the defined number may be 0.05. In other implementations, the defined number may be lower (e.g., 0.02), resulting in a more conservative approach (i.e., larger required difference) in determining if the test model is performing significantly better than the reference model. In comparison, if the defined number is higher (e.g., 0.07), a more aggressive approach is applied and a smaller difference between the lowest scored test model marker score and the lowest scored reference model marker score is needed to determine that the difference is statistically significant.

If it is determined that the test model improvement over the reference model does not exceed the significance threshold, a determination may be made that the reference model and the test model are similar at determining out-of-class data items, as in 518. In an example where the reference model has been deployed, such a determination may result in a decision to not replace the reference model with the test model.

In comparison, if it is determined that the difference between the lowest scored reference model and the lowest scored test model does exceed the significance threshold, it may be determined that the test model performs better at determining out-of-class data items (e.g., non-malicious data), as in 520.

Figure 6:
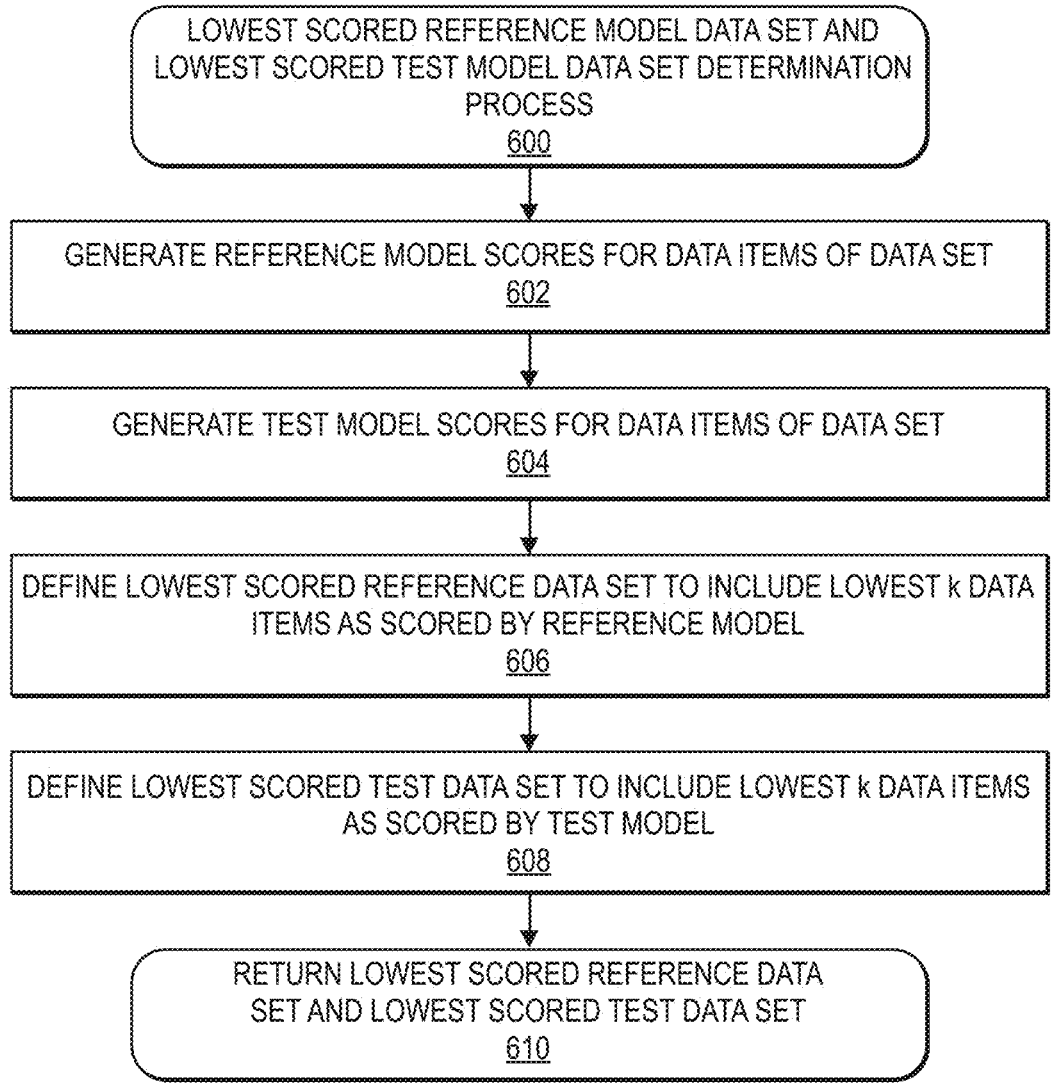
FIG. 6 is an example lowest scored reference model data set and a lowest scored test model data set determination process, in accordance with disclosed implementations.

FIG. 6 is an example lowest scored reference model data set and lowest scored test model data set determination process 600, in accordance with disclosed implementations.

The example process 600 begins by generating reference model scores for data items of the data set, as in 602. As discussed above, a data set that includes a plurality of data items of a type/class that may be processed by the reference model and the test model may be established. Each of those data items may be processed by the reference model to compute reference model scores indicative of a likelihood that the data item is of a type/class for which the reference model is trained to detect. For example, if the reference model is trained to detect malicious domains, each domain (a data item) of the data set may be processed by the reference model and a corresponding reference model data item score output by the reference model indicating a likelihood, as determined by the reference model, that the domain is a malicious domain.

Likewise, each data item of the data set may be processed by the test model to compute test model scores indicative of a likelihood that the data item is of a type for which the test model is trained to detect, as in 604. For example, if the test model is trained to detect malicious domains, each domain (a data item) of the data set may be processed by the test model and a corresponding test model data item score output by the test model indicating a likelihood, as determined by the test model, that the domain is a malicious domain.

In this example, a lowest scored reference model data set may be defined to include a defined number (k) of data items from the data set having the lowest reference model scores as computed by the reference model, as in 606. The defined number of data items (k) may be any number of data items that is less than all of the data items of the data set. Accordingly, the number of data items included in the lowest scored reference model data set is a sub-set of the data items included in the data set.

Similarly, a lowest scored test model data set may be defined to include the defined number (k) of data items from the data set having the lowest test model scores as computed by the test model, as in 608. Like the lowest scored reference model data set, the number of data items included in the lowest scored test model data set is a sub-set of the data items included in the data set. However, because the model scores assigned by each of the reference model and the test model for the data items of the data set may be different for the same data item, the data items included in each of the lowest scored reference model data set and the lowest scored test model data set may be different.

Finally, the example process 600 returns each of the lowest scored reference model data set and the lowest scored test model data set, as in 610.

Figure 7:
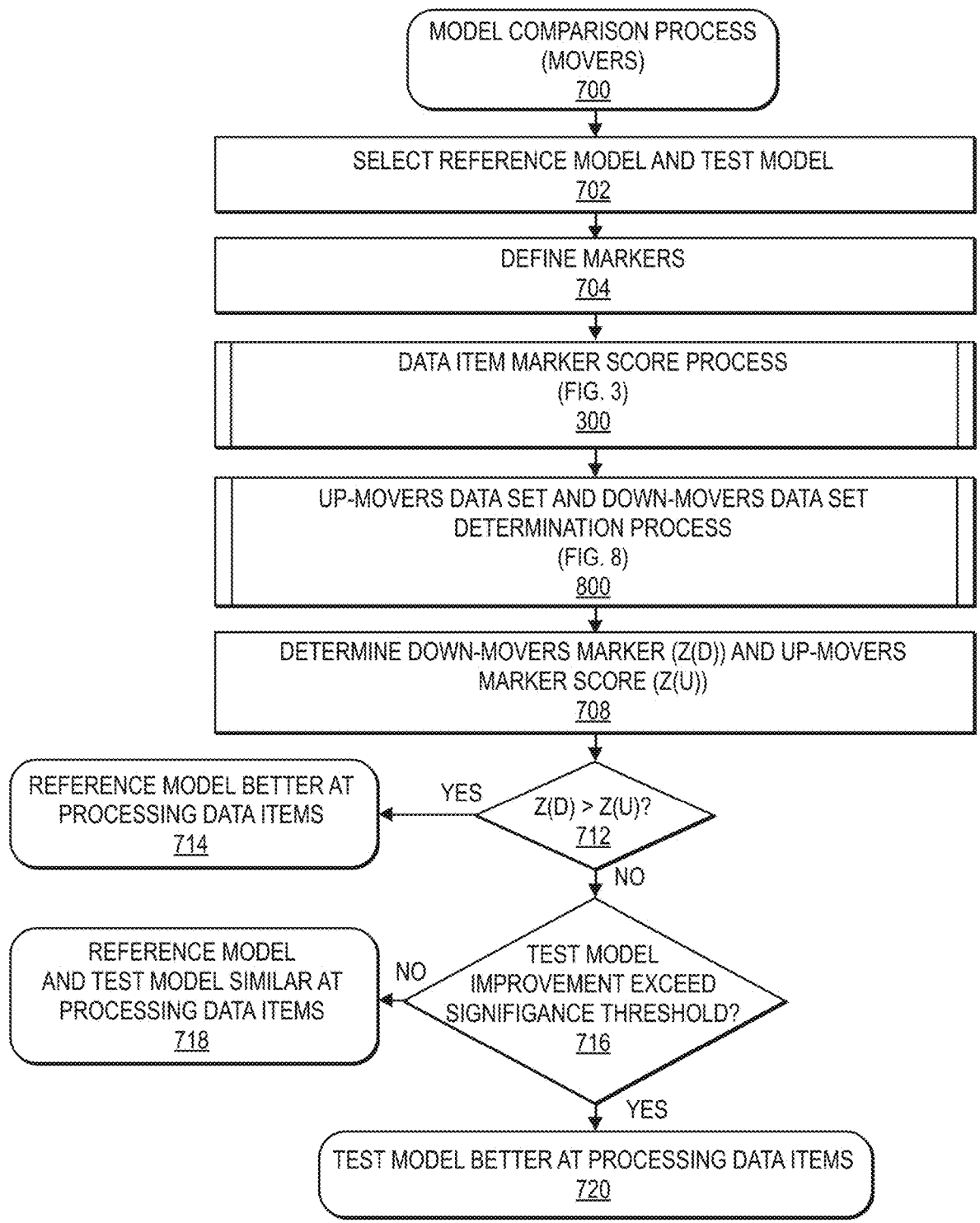
FIG. 7 is an example model comparison process utilizing data items moving up or down in scores between reference model scores and test model scores, in accordance with disclosed implementations.

FIG. 7 is a model comparison process 700 utilizing data items moving up or down in scores between a reference model score and a test model score, in accordance with disclosed implementations.

The example process 700 begins by selecting a reference model and a test model, as in 702. As discussed above, the reference model and the test model may be any two machine learning models that have been trained to process the same types of data items for the same type(s) of purpose(s), such as detection of malicious domains. Likewise, while the discussed examples describe comparison of the performance of two machine learning models, the disclosed implementations may be used with any number of machine learning models (two or more) and the discussion of two models is provided only for ease of explanation.

In addition, one or more markers are defined for a data set that includes a plurality of data items that may be processed by the first model and the second model, as in 704, and the data item marker score process 300 (FIG. 3) is performed to generate data item marker scores for each data item of the data set. In some implementations, if markers have already been defined for the data set, for example as defined at block 104 in FIG. 1 or block 504 in FIG. 5, and marker scores generated for the data set, as discussed with respect to FIG. 3, blocks 702 and 300 may be omitted from the example process 700 and the existing marker scores utilized for the data items of the data set.

In addition to determining data item marker scores for data items of the data set or utilizing existing data item marker scores for data items of the data set, an up-movers data set and a down-movers data set are determined, as in 800. Determination of the up-movers data set and the down-movers data set is discussed further below with respect to FIG. 8. As discussed further below, the up-movers data set and the down-movers data set each include a sub-set of the data set of data items. Likewise, the data items included in the up-movers data set are those data items that moved upward in ranking the most between the reference model score and the test model score assigned to those data items and the data items included in the down-movers data set are those data items that moved downward the most in ranking between the reference model scores and the test model scores assigned to those data items.

Based on the data item marker scores assigned to each data item included in the down-movers data set, a down-movers marker score ($Z(D)$) for the down-movers data set is determined, as in 708. For example, the data item marker scores assigned to each of the data items included in the down-movers data set may be combined, for example in accordance with equation (2) above, to produce a down-movers data set marker score ($Z(D)$) for the down-movers data set. Likewise, based on the marker scores assigned to each data item included in the up-movers data set, an up-movers data set marker score ($Z(U)$) for the up-movers data set is determined, as in 708. For example, the marker scores assigned to each of the data items included in the up-movers data set may be combined, for example in accordance with equation (2) above, to produce an up-movers data set marker score ($Z(U)$) for the up-movers data set.

A determination may then be made as to whether the down-movers data set marker score ($Z(D)$) is greater than the up-movers data set marker score ($Z(U)$), as in 712. If it is determined that the down-movers marker score is greater than the up-movers marker score, the example process determines that the reference model is better than the test model at processing data items, as in 714. In comparison, if it is determined that the up-movers data set marker score is greater than the down-movers data set marker score, it may be determined that the test model is better at processing data items.

In some implementations, in response to determining that the test model is better at processing data items, a determination may be made as to whether the improvement of the test model over the reference model at processing data items exceeds a significance threshold, as in 716. The significance threshold may be any value and, in some implementations, may be zero. In other examples, the significance threshold may be a determination as to whether the difference is statistically significant. Any of a variety of techniques may be utilized to determine whether the difference between the processing of the test model and the reference model is statistically significant. For example, a Welch's t-test, which is known in the art, may be utilized to determine a p-value between the up-movers data set marker score and the down-movers data set marker score. For example, a p-value may be determined as a difference between an average and/or standard deviation between each of the marker scores determined for each data item included in the top scored reference model and an average and/or standard deviation between each of the marker scores determined for each data item included in the top scored test model. If the p-value is less than a defined number, it may be determined that the difference is statistically significant. For example, the defined number may be 0.05. In other implementations, the defined number may be lower (e.g., 0.02), resulting in a more conservative approach (i.e., larger required difference) in determining if the test model is performing significantly better than the reference model. In comparison, if the defined number is higher (e.g., 0.07), a more aggressive approach is applied and a smaller difference between the test model marker score and the reference model marker score is needed to determine that the difference is statistically significant.

If it is determined that the test model improvement over the reference model does not exceed the significance threshold, a determination is made that the reference model and the test model are similar at processing data items, as in 718. In an example where the reference model has been deployed, such a determination may result in a decision to not replace the reference model with the test model.

In comparison, if it is determined that the difference in performance between the test model and the reference model does exceed the significance threshold, it may be determined that the test model performs better at processing data items, as in 720.

Figure 8:
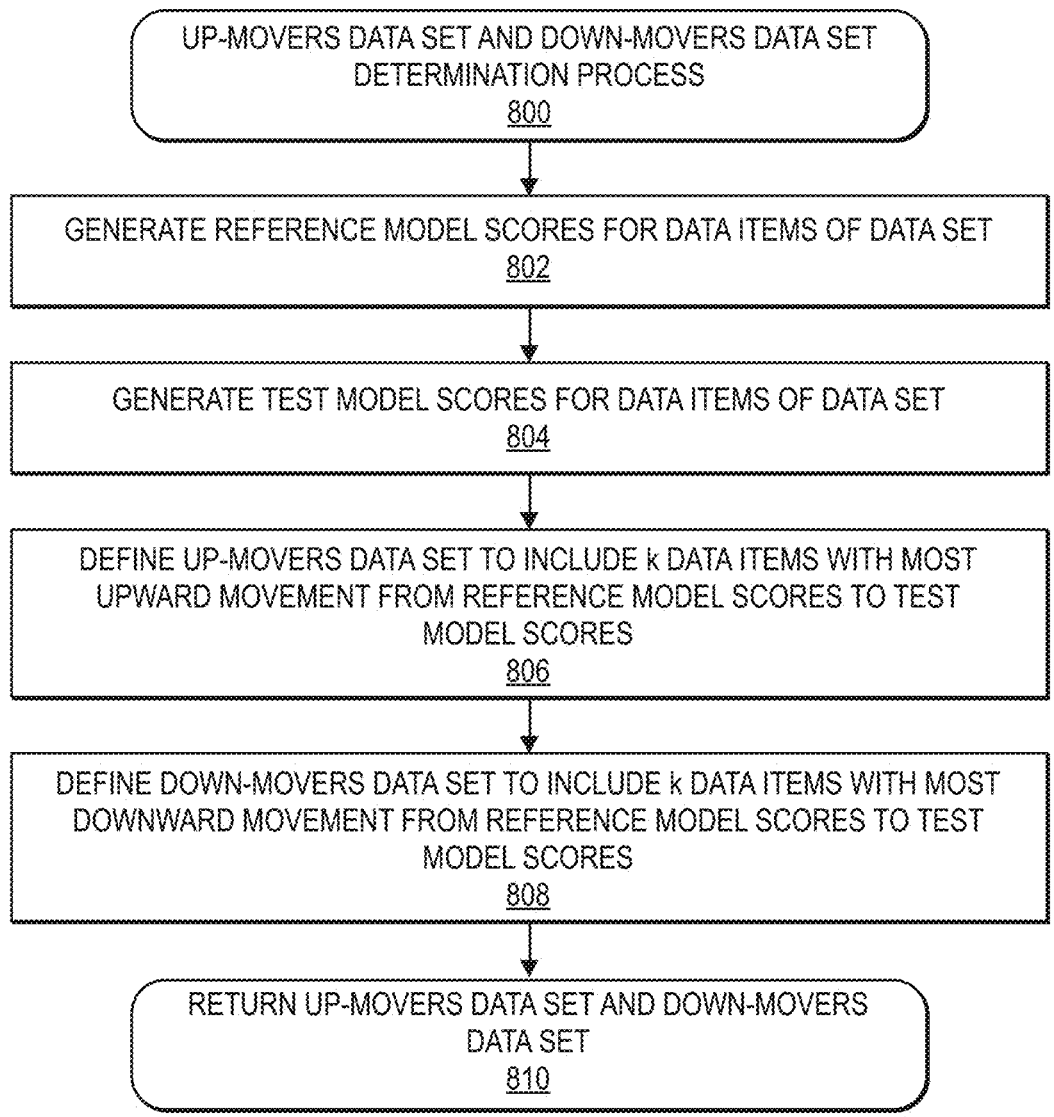
FIG. 8 is an example up-movers data set and down-movers data set determination process, in accordance with disclosed implementations.

FIG. 8 is an example up-movers data set and down-movers data set determination process 800, in accordance with disclosed implementations.

The example process 800 begins by generating reference model scores for data items of the data set, as in 802. As discussed above, a data set that includes a plurality of data items of a type/class that may be processed by the reference model and the test model may be established. Each of those data items may be processed by the reference model to compute reference model scores indicative of a likelihood that the data item is of a type/class for which the reference model is trained to detect. For example, if the reference model is trained to detect malicious domains, each domain (a data item) of the data set may be processed by the reference model and a corresponding reference model data item score output by the reference model indicating a likelihood, as determined by the reference model, that the domain is a malicious domain.

Likewise, each data item of the data set may be processed by the test model to compute test model scores indicative of a likelihood that the data item is of a type/class for which the test model is trained to detect, as in 804. For example, if the test model is trained to detect malicious domains, each domain (a data item) of the data set may be processed by the test model and a corresponding test model data item score output by the test model indicating a likelihood, as determined by the test model, that the domain is a malicious domain.

In this example, an up-movers data set may be defined to include a defined number (k) of data items with the most upward movement from the reference model score determined for the data item and the test model score determined for the data item, as in 806. The defined number of data items (k) may be any number of data items that is less than all of the data items of the data set. Accordingly, the number of data items included in the up-movers data set is a sub-set of the data items included in the data set.

Similarly, a down-movers data set may be defined to include the defined number (k) of data items from the data set with the most downward movement from the reference model score determined for the data item to the test model score determined for the data item, as in 808. Like the up-movers data set, the number of data items included in the down-movers data set is a sub-set of the data items included in the data set.

Finally, the example process 800 returns each of the up-movers data set and the down-movers data set, as in 810.

Figure 9:
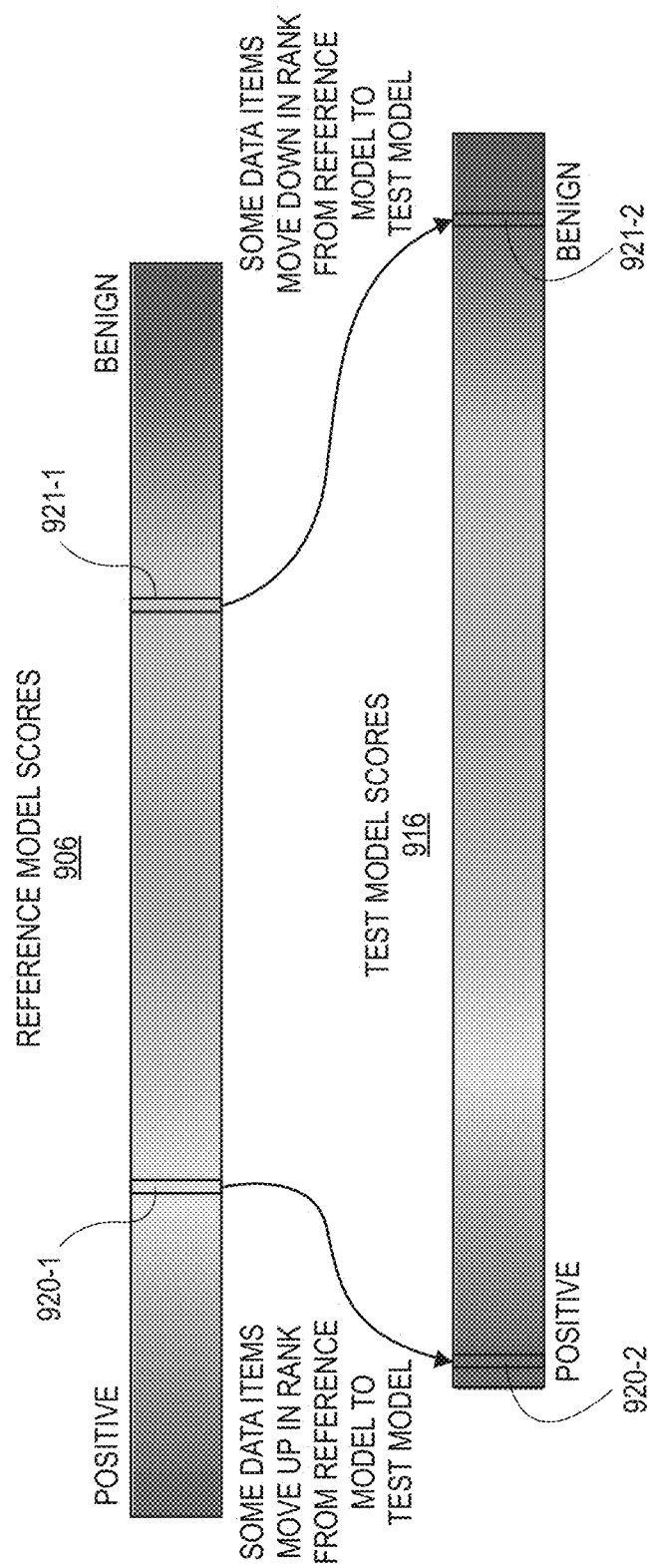
FIG. 9 is a block diagram illustrating a range of reference model scores and a range of test model scores, in accordance with disclosed implementations.

FIG. 9 is a block diagram illustrating a range of reference model scores 906 and a range of test model scores 916 and the movement of data items 920, 921 between the reference model scores and the test model scores, in accordance with disclosed implementations.

As illustrated, data items of a data set may be processed by the reference model and a reference model score assigned to each data item between a highest scored marker and a lowest scored marker. In the illustrated example, data item 920 has been assigned a high reference model score by the reference model, as illustrated by indicator 920-1 and data item 921 has been assigned a low reference model score by the reference model, as illustrated by indicator 921-1.

When the same data items are processed by the test model, test model scores are assigned to those data items by the test model. Because the test model is different than the reference model, some of those data items will be assigned a different model score by the test model, resulting in movement of the data item either up or down in the range of model scores assigned to data items of the data set. For example, as illustrated in FIG. 9, the test model score assigned to data item 920 by the test model has resulted in the data item moving up to a higher test model score, as illustrated by indicator 920-2 than was assigned by the reference model. In comparison, the test model score assigned to data item 921 by the test model has resulted in the data item moving down to a lower test model score, as illustrated by indicator 921-2 than was assigned by the reference model.

As discussed with respect to FIG. 8, data items moving the furthest in rank or score in the top scored range, such as data item 920, may be included in the up-movers data set. Likewise, data items moving the furthest in rank or score in the downward or lowest scored range, such as data item 921, may be included in the down-movers data set.

Although the above examples have described reference model data sets and test model data sets to include top scored data items, lowest scored data items, up-mover data items, or down-mover data items, as will be appreciated, the disclosed implementations are equally applicable to any defined sub-sets of data items that may be selected for a reference model and a test model. For example, a first sub-set of data items having similar reference model scores may be specified for a reference model and a second sub-set of data items having similar test model scores may be specified for a test model. In short, any sub-set of data items may be selected for the reference model data set and any sub-set of data items may be selected for the test model data set.

Figure 10:
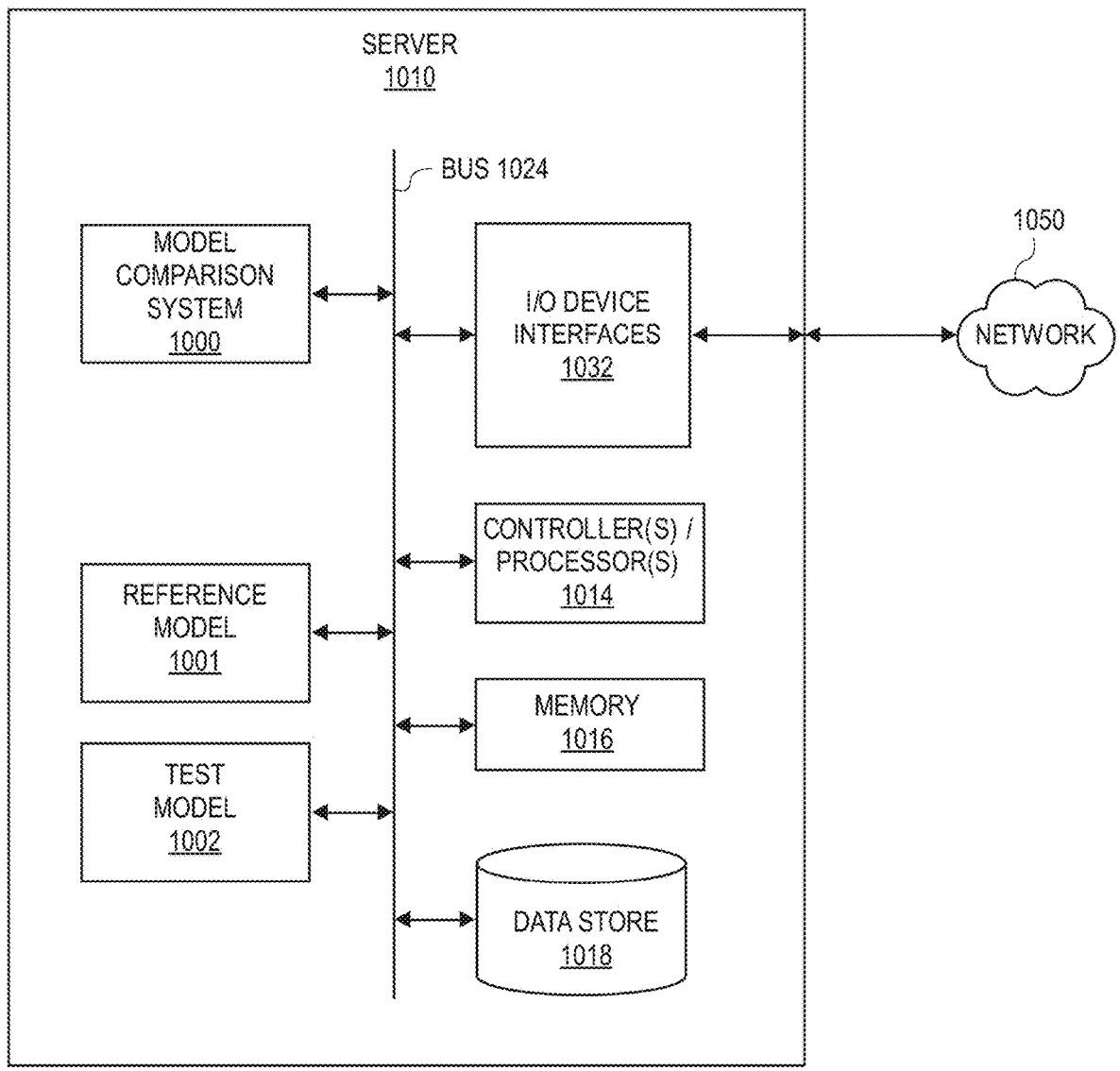
FIG. 10 is a block diagram of an example server, in accordance with disclosed implementations.

FIG. 10 is a block diagram conceptually illustrating example components of a remote computing device, such as a remote server 1010 that may include and/or execute one or more of the reference model 1001, the test model 1002, and/or the model comparison system 1000, in accordance with described implementations. Multiple such servers 1010 may be included in the system.

Each of these server(s) 1010 may include one or more controllers/processors 1014, that may each include a central processing unit (CPU) for processing data and computer-readable instructions, and a memory 1016 for storing data and instructions. The memory 1016 may individually include volatile random-access memory (RAM), non-volatile read only memory (ROM), non-volatile magnetoresistive random-access memory (MRAM) and/or other types of memory. Each server may also include a data storage component 1018, for storing data, controller/processor-executable instructions, machine learning models, data sets, reference data sets, test data sets, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 1050 (e.g., the Internet, cellular networks, satellite networks) through respective input/output device interfaces 1032.

Computer instructions for operating each server 1010 and its various components may be executed by the respective server's controller(s)/processor(s) 1014, using the memory 1016 as temporary "working" storage at runtime. A server's computer instructions may be stored in a non-transitory manner in non-volatile memory 1016, storage 1018, and/or an external device(s). Alternatively, some or all of the executable instructions may be embedded in hardware or firmware on the respective device in addition to or instead of software.

Each server 1010 includes input/output device interfaces 1032. A variety of components may be connected through the input/output device interfaces. Additionally, each server 1010 may include an address/data bus 1024 for conveying data among components of the respective server. Each component within a server 1010 may also be directly connected to other components in addition to (or instead of) being connected to other components across the bus 1024.

The components of the server(s) 1010, as illustrated in FIG. 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 1 through 3 and 5 through 8, orders in which such methods or processes are presented are not intended to be construed as any limitation on the claimed inventions, and any number of the method or process steps or boxes described herein can be omitted as optional or combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   defining a marker, that if detected in a data item, is indicative that the data item is a malicious data item;
   for each of a plurality of data items of a data set:
      determining a marker score for the marker; and
      determining a data item marker score based at least in part on the marker score;
   determining, for a first machine learning model trained to detect malicious data items, a first sub-plurality of data items of the plurality of data items;
   determining, for the first sub-plurality of data items and based at least in part on the data item marker scores determined for each of the first sub-plurality of data items, a first model marker score;
   determining, for a second machine learning model trained to detect malicious data items, a second sub-plurality of data items of the plurality of data items;
   determining, for the second sub-plurality of data items and based at least in part on the data item marker scores determined for each of the second sub-plurality of data items, a second model marker score;
   determining, based at least in part on the first model marker score and the second model marker score, that the second machine learning model performs better at detecting malicious data items than the first machine learning model; and
   selecting the second machine learning model to process data items to detect malicious data items.

2. The method of claim 1, wherein determining the first sub-plurality of data items includes:
   processing, with the first machine learning model, at least a portion of the plurality of data items of the data set to determine, for each data item of the at least a portion of the plurality of data items, a first machine learning model score indicative of a first probability that the data item is malicious, as determined by the first machine learning model; and
   selecting the first sub-plurality of data items from the at least a portion of the plurality of data items based at least in part on the first machine learning model scores determined for each data item of the at least a portion of the plurality of data items.

3. The method of claim 2, wherein determining the second sub-plurality of data items includes:
   processing, with the second machine learning model, the at least a portion of the plurality of data items of the data set to determine, for each data item of the at least a portion of the plurality to data items, a second machine learning model score indicative of a second probability that the data item is malicious, as determined by the second machine learning model; and selecting the second sub-plurality of data items from the at least a portion of the plurality of data items based at least in part on the second machine learning model scores determined for each data item of the at least a portion of the plurality of data items.

4. The method of claim 2, wherein the first sub-plurality of data items are selected as:
   a first defined number of data items having highest first machine learning model scores;
   a second defined number of data items having lowest first machine learning model scores;
   a third defined number of data items that include both the first defined number of data items and the second defined number of data items; or
   a fourth defined number of data items having a similar score.

5. The method of claim 1, wherein determining that the second machine learning model performs better than the first machine learning model further includes:
   determining that a difference between the first machine learning model and the second machine learning model exceeds a threshold.

6. The method of claim 1, wherein determining the data item marker score based at least in part on the marker score includes, at least one of:
   summing the marker score with a second marker score determined for a second marker of the data item to produce the data item marker score;
   averaging the marker score with the second marker score to produce the data item marker score; or
   computing a weighted average of the marker score and the second marker score to produce the data item marker score.

7. A computing system, comprising:
   one or more processors; and
   a memory storing program instructions that, when executed by the one or more processors, causes the one or more processors to at least:
      define a marker for a data set that includes a plurality of data items, wherein the marker is present in at least some of the plurality of data items;
      for each of the plurality of data items:
         determine a marker score for the marker; and
         produce a data item marker score based at least in part on the marker score;
      determine, for a first machine learning model, a first sub-plurality of data items of the plurality of data items;
      determine, for the first sub-plurality of data items and based at least in part on the data item marker score determined for each of the first sub-plurality of data items, a first model marker score;
      determine, for a second machine learning model, a second sub-plurality of data items of the plurality of data items;
      determine, for the second sub-plurality of data items and based at least in part on the data item marker score determined for each of the second sub-plurality of data items, a second model marker score; and
      determine, based at least in part on the first model marker score and the second model marker score, that the second machine learning model performs better than the first machine learning model.

8. The computing system of claim 7, wherein the program instructions that, when executed by the one or more processors further cause the one or more processors to at least:
   determine, based at least in part on the first model marker score and the second model marker score, that a performance improvement of the second machine learning model is statistically significant; and
   in response to a determination that the second machine learning model performs better than the first machine learning model and that the performance improvement is statistically significant, select the second machine learning model to process data items.

9. The computing system of claim 7, wherein the program instructions that, when executed by the one or more processors, further cause the one or more processors to at least:
   determine, based at least in part on the first model marker score and the second model marker score, that a performance improvement of the second machine learning model is not statistically significant; and
   in response to a determination that the second machine learning model performs better than the first machine learning model and that the performance improvement is not statistically significant, continue using the first machine learning model to process data items of the data set.

10. The computing system of claim 7, wherein:
    the program instructions that, when executed by the one or more processors to determine the first sub-plurality of data items, further include instructions that, when executed by the one or more processors, further cause the one or more processors to at least:
       process, with the first machine learning model, at least a portion of the plurality of data items of the data set to determine, for each data item of the at least a portion of the plurality of data items, a first machine learning model score; and
       select the first sub-plurality of data items from the at least a portion of the plurality of data items based at least in part on the first machine learning model scores determined for each data item of the at least a portion of the plurality of data items; and
    the program instructions, that when executed by the one or more processors to determine the second sub-plurality of data items, further include instructions that, when executed by the one or more processors, further cause the one or more processors to at least:
       process, with the second machine learning model, the at least a portion of the plurality of data items of the data set to determine, for each data item of the at least a portion of the plurality to data items, a second machine learning model score; and
       select the second sub-plurality of data items from the at least a portion of the plurality of data items based at least in part on the second machine learning model scores determined for each data item of the at least a portion of the plurality of data items.

11. The computing system of claim 10, wherein the program instructions that, when executed by the one or more processors to select the first sub-plurality of data items, further include instructions that, when executed by the one or more processors, further cause the one or more processors to at least:
    select the first sub-plurality of data items as:
       a first defined number of data items having highest first machine learning model scores;
       a second defined number of data items having lowest first machine learning model scores;

a third defined number of data items that include both the first defined number of data items and the second defined number of data items; or a fourth defined number of data items having a similar score.

12. The computing system of claim 11, wherein the program instructions that, when executed by the one or more processors to select the second sub-plurality of data items, further include instructions that, when executed by the one or more processors, further cause the one or more processors to at least:

select the second sub-plurality of data items as:
a fourth defined number of data items having highest second machine learning model scores;
a fifth defined number of data items having lowest second machine learning model scores;
a sixth defined number of data items that include both the fourth defined number of data items and the fifth defined number of data items; or
a seventh defined number of data items having a similar score.

13. The computing system of claim 7, wherein:
the first machine learning model and the second machine learning model are trained to detect malicious data items of the data set; and
the marker is at least one of:
an in-class marker that, if detected in a data item, is indicative that the data item is malicious; or
an out-of-class marker that, if detected in a data item, is indicative that the data item is benign.

14. The computing system of claim 7, wherein the program instructions that, when executed by the one or more processors to produce a data item marker score based at least in part on the marker score, further include instructions that, when executed by the one or more processors, further cause the one or more processors to at least one of:
sum the marker score with a second marker score determined for a second marker of the data item to produce the data item marker score;
average the marker score with the second marker score to produce the data item marker score; or
compute a weighted average of the marker score and the second marker score to produce the data item marker score.

15. The computing system of claim 7, wherein the marker score is indicative of a probability that a data item is malicious.

16. A computer-implemented method, comprising:
defining a plurality of markers for a data set that includes a plurality of data items, wherein each marker of the plurality of markers is present in at least some of the plurality of data items;
determining, for each of the plurality of data items of the data set and based at least in part on the plurality of markers, a data item marker score;
processing, with a first machine learning model, at least a portion of the plurality of data items of the data set to determine, for each data item of the at least a portion of the plurality to data items, a first machine learning model score;
selecting a first sub-plurality of data items from the at least a portion of the plurality of data items based at least in part on the first machine learning model scores determined for each data item of the at least a portion of the plurality of data items;
determining, for the first sub-plurality of data items and based at least in part on the data item marker scores determined for each of the first sub-plurality of data items, a first model marker score;
determining, for a second machine learning model, a second sub-plurality of data items of the plurality of data items;
determining, for the second sub-plurality of data items and based at least in part on the data item marker scores determined for each of the second sub-plurality of data items, a second model marker score;
determining that the second model marker score is greater than the first model marker score; and
in response to determining that the second model marker score is greater than the first model marker score:
determining that the second machine learning model performs better on the data set than the first machine learning model; and
selecting the second machine learning model to process data items of the data set.

17. The computer-implemented method of claim 16, wherein the first sub-plurality of data items are selected as:
a first defined number of data items having highest first machine learning model scores;
a second defined number of data items having lowest first machine learning model scores;
a third defined number of data items that include both the first defined number of data items and the second defined number of data items; or
a fourth defined number of data items having a similar score.

18. The computer-implemented method of claim 16, wherein determining that the second machine learning model performs better than the first machine learning model further includes:
determining that a difference between the second model marker score and the first model marker score exceeds a threshold.

19. The computer-implemented method of claim 16, wherein determining, for each of the plurality of data items of the data set and based at least in part on the plurality of markers, a data item marker score, further includes:
for each of the plurality of data items:
determining a marker score for each of the plurality of markers; and
combining the marker score determined for each of the plurality of markers to produce the data item marker score.

20. The computer-implemented method of claim 16, wherein:
a first marker of the plurality of markers is an in-class marker that, if detected in a data item, is indicative of the data item being in a first class for which the first machine learning model and the second machine learning model are trained to detect; and
a second marker of the plurality of markers is an out-of-class marker that, if detected in a data item, is indicative of the data item being of out-of-class for which the first machine learning model and the second machine learning model are trained to detect.

* * * * *